May 1, 1962 J. H. DEBS 3,032,233
MULTIPLE BAKING PAN ASSEMBLY
Filed Feb. 20, 1959

INVENTOR.
Jerome H. Debs
BY
Attorneys

United States Patent Office 3,032,233
Patented May 1, 1962

3,032,233
MULTIPLE BAKING PAN ASSEMBLY
Jerome H. Debs, Chicago, Ill., assignor to Chicago Metallic Mfg. Co., Chicago, Ill., a corporation of Illinois
Filed Feb. 20, 1959, Ser. No. 794,647
1 Claim. (Cl. 220—23.2)

This invention relates to a multiple baking pan assembly for use with automatic equipment used by bakeries in the preparation of baked goods.

It is an object of this invention to produce a new and improved multiple baking pan assembly, and it is a related object to produce a multiple baking pan assembly of the type described which is adapted for use with automatic equipment to resist deformation by the forces and conditions existing in automatic handling.

These and other objects and advantages of this invention will hereinafter appear and for purposes of illustration, but not of limitation, an embodiment of the invention is shown in the accompanying drawing, in which.

Figure 3:
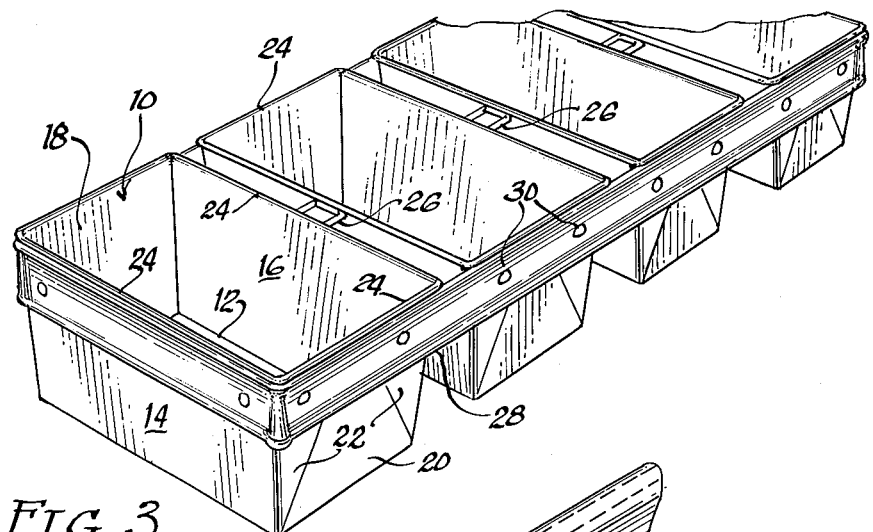
FIGURE 3 is a view similar to that of FIGURE 1 with the strap member extending continuously about the assembly.
Figure 2:
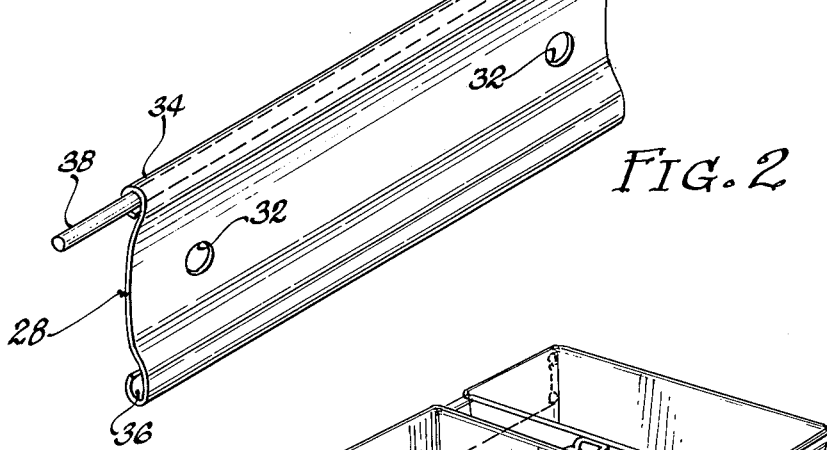
FIGURE 2 is a perspective elevational view of the strapping member employed in the baking pan assembly.
Figure 1:
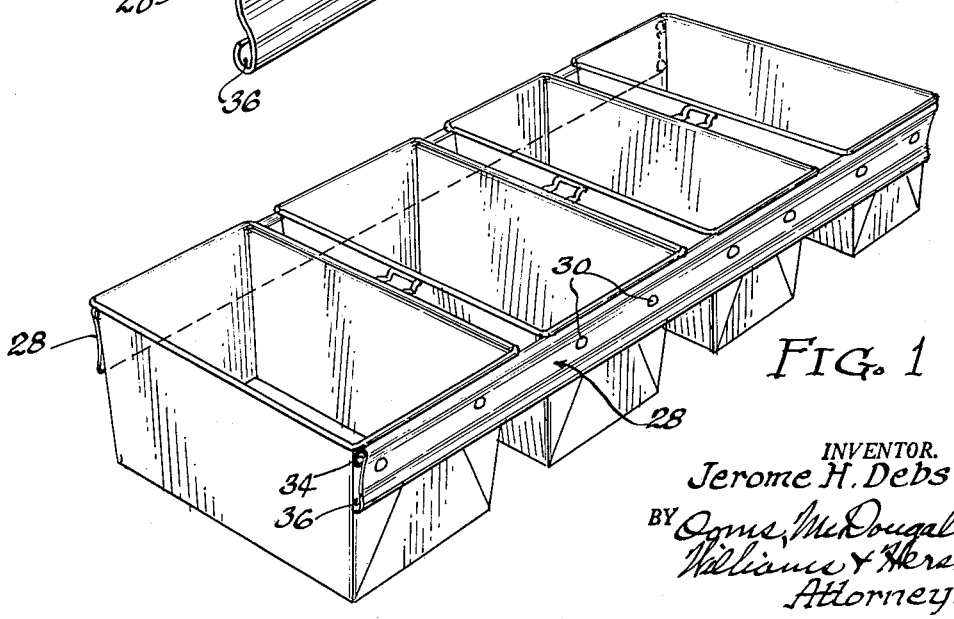
FIGURE 1 is a perspective view of a fragmentary portion of a baking pan assembly embodying the features of this invention.

Briefly described, a baking pan assembly is formed of a multiplicity of baking pans 10 aligned in side-by-side, spaced relation in one or more rows. The illustrated modification makes use of four baking pans 10 in side-by-side, spaced relation. Each baking pan comprises a deep-dished pan for baking bread and is formed of a sheet of metal folded to form a flat bottom wall 12, side walls 14 and 16, and end walls 18 and 20 extending upwardly substantially perpendicularly from the outer edges of the bottom wall, with the extra material folded over as folds 22 adjacent the outer faces of the end walls. The edges of the metal strip forming the side and end walls are turned about a framing wire (not shown) to provide a beaded edge 24 about the upper periphery of each pan for stiffness and reinforcement.

Spacers 26 secured at their lateral edges to the adjacent side walls of the spaced pans operate to hold the pans together in the assembled relation with the desired spaced relation therebetween. These spacers are sometimes formed with a downwardly turned portion at the center for engagement by the means for effecting linear displacement of the assembly in the line of travel through the baking and related operations.

The assembly is further formed with a metal strap 28 which extends about the periphery of the pan assembly and is secured to the adjacent outer walls of the outermost pans in the assembly by rivets 30 to effect the assembled relation. The strap member comprises an elongate band of metal deformed to correspond to the shape of the pan assembly, with rivet holes 32 formed therein for projection of the rivets 30 or other metal-fastening means therethrough to secure the strap member to the adjacent folds on the end walls of the pans and to the side walls. The strap 28 is of substantial width, with the upper and lower edges turned inwardly curvilinearly into small loops 34 and 36, respectively, for reinforcement and stiffness and to avoid the presence of sharp edges.

In the use of the described baking pan assembly with automatic equipment, the pan assembly is often exposed to various forces which tend to cause deformation of the straps and spacers and thereby to cause deviations to exist in the dimensional characteristics of the assembly and in the arrangement of the pans. This leads to difficulties in operation and use which often result in the inability to make continued use of the pan assembly with automatic equipment.

It has been found, in accordance with the practice of this invention, that characteristics can be embodied in the pan assembly better to resist the forces causing deviations and deformations of the elements of the multiple baking pan assembly, thereby to protect the pans and increase the useful life of the assembly. For this purpose, a wire 38 formed of spring metal is provided within the beaded end portion 34 of the portion of the strap which extends across the end walls of the faces to interconnect the pans in the assembled relation. In such construction, it is unnecessary for the strap to extend continuously about the side walls of the outermost pans although the described improvements can also be secured when the strap member embodying the wire element extends continuously about the outer walls of the pan assembly, as in prior practice. When the endless wire of spring metal is fixed with respect to the strap member in which it is received, and preferably confined within the beaded portion thereof, the forces of deformation are immediately distributed throughout the periphery of the strap member and pan assembly to cause substantial dissipation thereof in a manner which prevents deformations from occurring.

Further, deformation forces are resisted by the wire of spring metal fixed to the beaded portion of the strap since deformation, either in the inward direction or in the outward direction, cannot be effected without corresponding elongation of the wire. The forces required to effect elongation of the wire are generally much greater than forces existing to cause deformation, such that permanent deformation is effectively resisted. Thus, while the strap itself is capable of being deformed, the wire of spring metal formed as an integral part thereof is not so easily stretched so that deformation can be resisted. This results from the fact that the wire is fixed in the beaded portion and that, for the beaded portion to bend, the length thereof must be increased at one side by comparison with the other, whereby the wire fixed therein is subject to an elongation force which it can effectively resist.

The wire can be fixed in position of use in the bead by spot welding or the like metal-joining means, but it has been found to be sufficient if the wire is tightly engaged within the bead to raise frictional forces in resistance to relative movement.

While the wire is illustrated as being received in the upper bead 34, it can be located in both of the beads 34 and 36.

It will be understood that changes may be made in the details of construction, arrangement and operation and that the pans of the assembly may be formed to other shapes for use in the manufacture of other baked goods without departing from the spirit of the invention, especially as defined in the following claim.

I claim:

A multiple baking pan assembly comprising a plurality of metal baking pans arranged in side-by-side spaced relation, said baking pans being formed of a bottom wall of perimetric shape and side and end walls extending upwardly substantially perpendicularly from the edges of the bottom wall, spacer means interconnecting the adjacent side walls of adjacent pans for maintaining the pans in the desired spaced relation, a metal strapping member extending continuously across the opposed end walls of the assembled pans and in abutting relation therewith, means joining the strapping member to the adjacent walls of the pan for maintaining the pans in the assembled relation, said strapping member being formed of an elongate band of metal having its upper and lower edges turned inwardly to form substantially closed curvilinear beads, a spring metal wire extending continuously across the end walls of the assembled pans throughout at least one of the beaded portions of the strap, and means securing the wire throughout the bead to prevent relative endwise movements of the wire in respect to the bead.

References Cited in the file of this patent

UNITED STATES PATENTS

| | | |
|---|---|---|
| 1,262,481 | Haigh | Apr. 9, 1918 |
| 1,416,208 | Jackson | May 16, 1922 |
| 1,668,332 | Ostendorf | May 1, 1928 |
| 2,035,041 | Benson | Mar. 24, 1936 |